July 12, 1960 W. E. ROOD, JR., ET AL 2,944,612
IRRIGATION FURROW FORMER
Filed Sept. 21, 1953 3 Sheets-Sheet 3
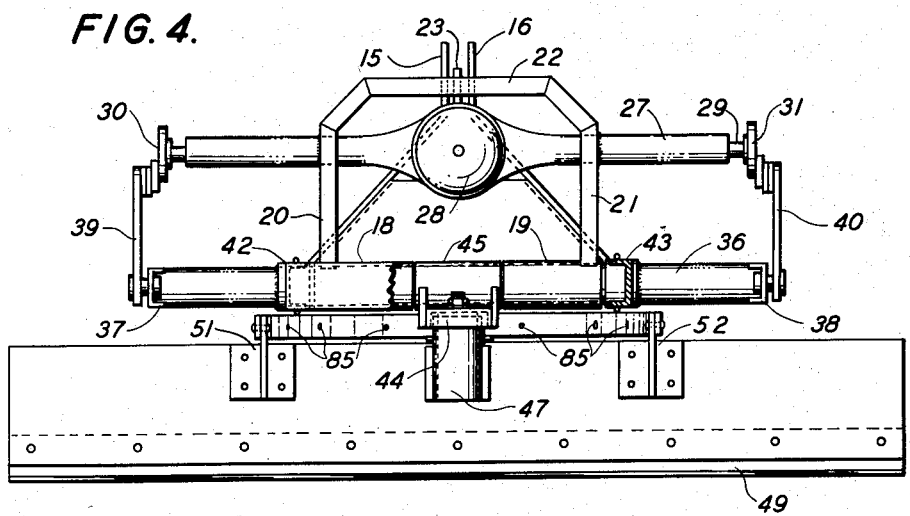
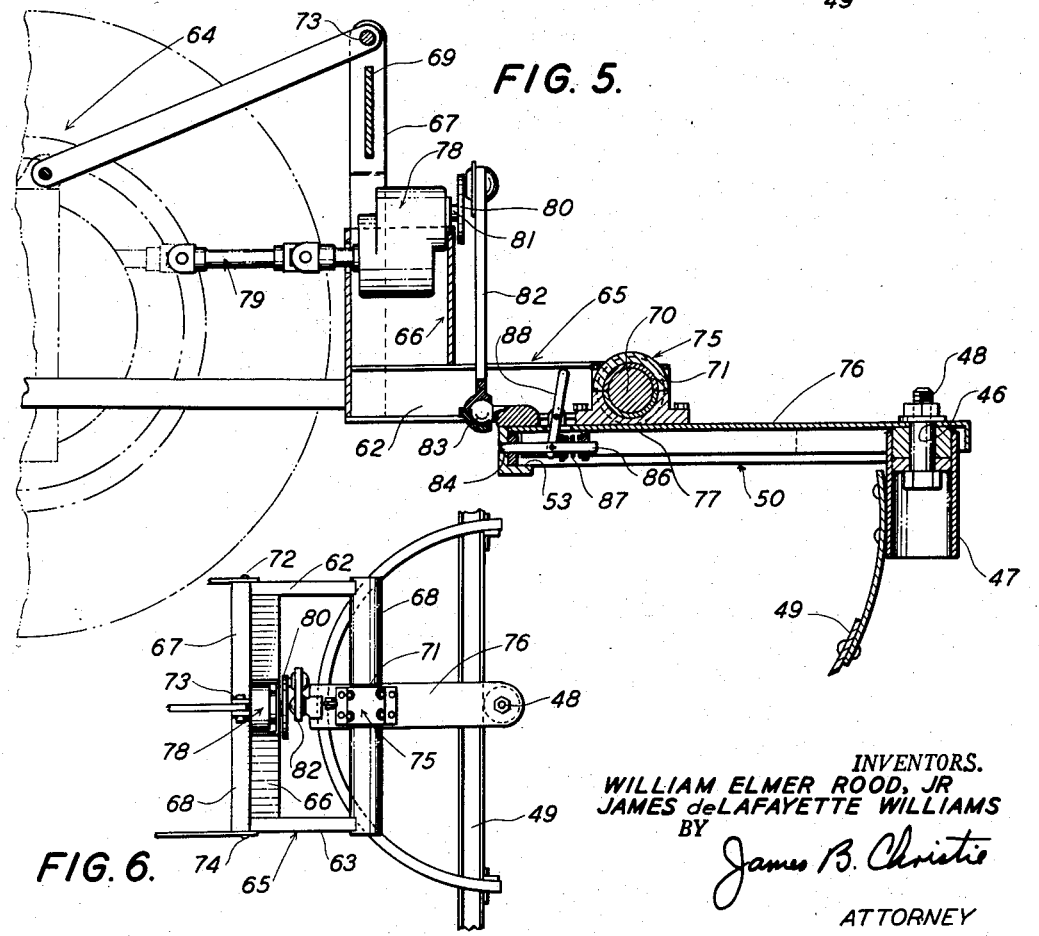
INVENTORS.
WILLIAM ELMER ROOD, JR
JAMES deLAFAYETTE WILLIAMS
BY
James B. Christie
ATTORNEY

United States Patent Office 2,944,612
Patented July 12, 1960

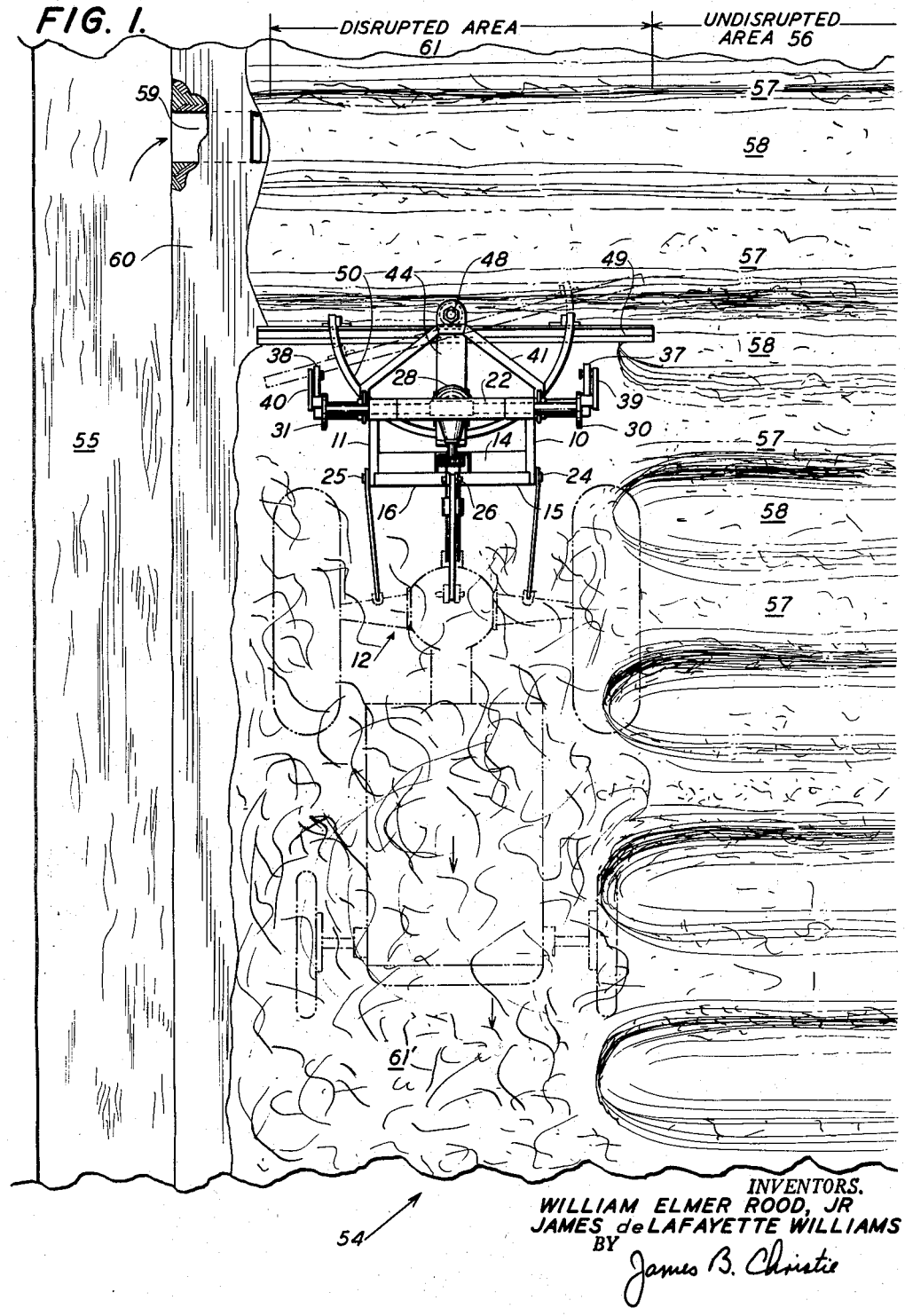

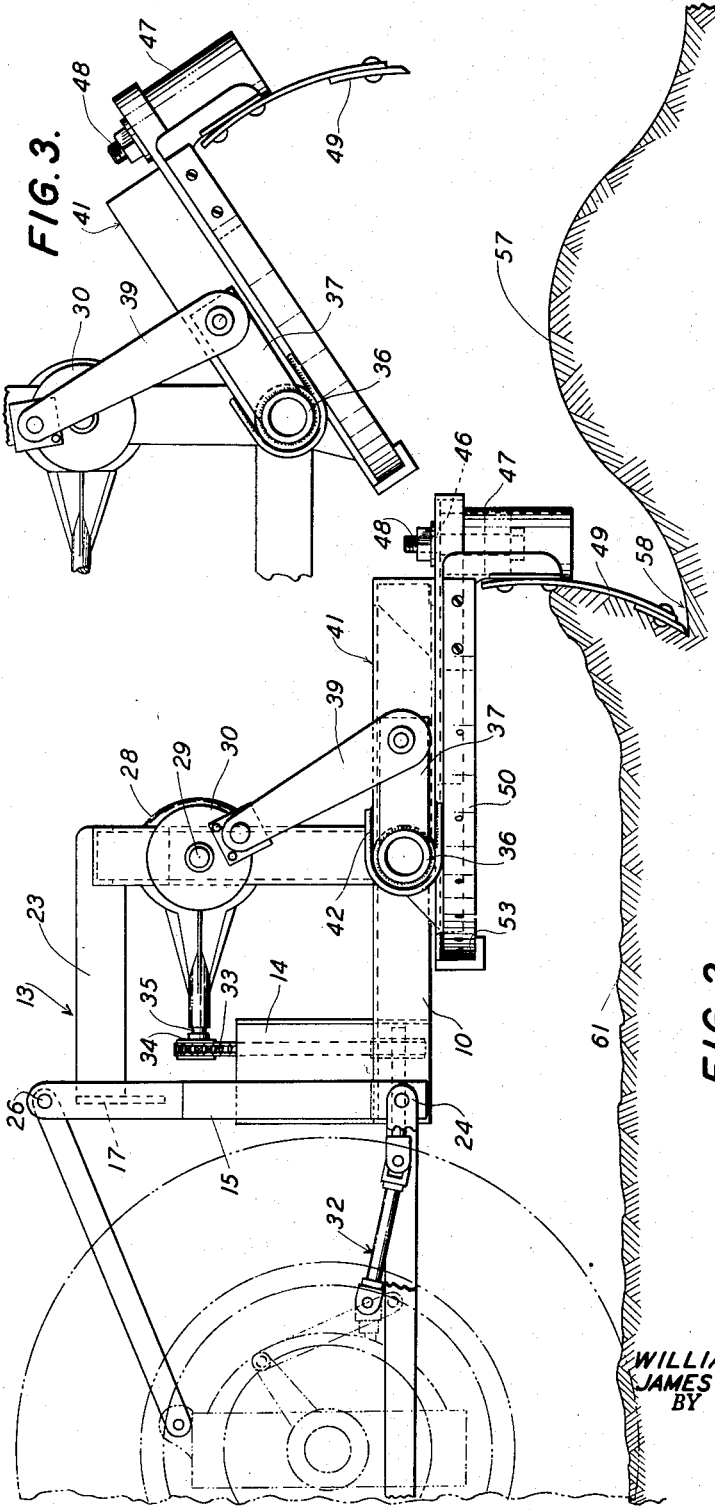

2,944,612

IRRIGATION FURROW FORMER

William Elmer Rood, Jr., Phoenix, and James De Lafayette Williams, Glendale, Ariz., assignors to Clarence S. Hadlock, doing business as Hadlock Welding and Machine Works, Mesa, Ariz.

Filed Sept. 21, 1953, Ser. No. 381,244

3 Claims. (Cl. 172—118)

This invention relates to earth moving and more specifically it relates to forming parallel rows of ridges and furrows alternately in an irrigated field.

In irrigated fields, where crops are grown as row crops, an irrigation ditch crosses the rows. Conduits are provided through a wall of the ditch at spaced intervals for admitting water to the rows. Usually each row is supplied water by a respective conduit aligned with the row. In working the field, cultivators, plows and the original row-forming machines must be turned around at the end of the rows, and therefore leave a disrupted row area several feet wide between the irrigation ditch and the undisrupted rows. In the past, the disrupted area has either been neglected or repaired by hand shoveling of the earth. If the area is neglected, proper irrigation of the field is not obtained, and in addition, that part of the field is not available for crop cultivation. Repairing of the disrupted area by manual labor is expensive and undesirable.

In terms of apparatus the present invention provides a device for forming furrows in the disrupted area automatically so as to form continuous, undisrupted rows in proper alignment with their respective conduits. In essence, the invention contemplates a mobile earth moving device comprising a blade disposed transverse to the direction of movement of the device along the ground and means automatically responsive to the movement of the device for moving the blade up and down with respect to the ground in a predetermined cycle.

In a preferred form, the device comprises a frame adapted to be attached to a tractor and a member pivotally attached to the frame so that it may be swung up and down on an axis transverse to the direction of the movement of the tractor along the ground. A blade or earth scoop is fastened to an end of the member and extends transverse to the direction of movement of the tractor. The blade is adapted to drag along the ground and means are provided to take power from the tractor so that the member is automatically raised and lowered as the tractor moves along the ground. In terms of method the invention contemplates forming a series of spaced furrows across the disrupted field area lying between the irrigation ditch and the undisrupted field area by disposing a blade at ground level substantially across the disrupted area. The blade is moved in a direction parallel to the ditch and simultaneously moved up and down.

These and other aspects of the invention will be understood from the following detailed description taken in conjunction with the accompanying drawings in which:

Fig. 1 is a plan view of the preferred form of the invention attached to the rear end of the tractor and ready for operation in an irrigated field;

Fig. 2 is a side elevation of the device of Fig. 1;

Fig. 3 is a side elevation of part of the device in Fig. 1 taken at a different part of the cycle of operation;

Fig. 4 is a rear elevation partly in section of the device of Fig. 1;

Fig. 5 is a side elevation partly in section of another embodiment of the invention; and Fig. 6 is a plan view of the embodiment shown in Fig. 5.

Referring to the device shown in Figs. 1 through 4, two parallel channel beams 10, 11 extend longitudinally from a tractor 12 to form the two bottom sides of a frame 13. A vertical cover box 14 is attached, as by welding, between the forward ends of the bottom sides. The upper end of the cover box is open. Rigid upwardly extending straps 15, 16 are fastened respectively to the forward ends of each of the bottom sides. The intermediate portion of each strap is bent inwardly at an angle from the vertical of about 50 degrees. The upper ends of the straps are bent so they are substantially vertical and are attached to a short transverse bar 17 approximately half way between the side beams. Transverse sleeves 18, 19 are attached respectively to each of the rear ends of the bottom sides. Upwardly extending channel beams 20, 21 are secured respectively to each of the sleeves. The upper ends of the vertical channel beams are each attached to the respective ends of a transverse cross-piece 22 which is formed from three channel beams welded in the shape of an arch. A longitudinal reinforcing strip 23 is attached to the center of the cross-piece and to the transverse bar 17. The forward end of the frame is attached to the rear of the tractor at three suspension points 24, 25, 26.

An elongated housing 27 is disposed transversely through the two vertical beams near their upper ends, and is rigidly attached thereto. A gear reduction assembly 28 is in the center portion of the housing, and a first rotatable shaft 29 powered by the gear assembly extends through the length of the housing. Cranks 30, 31 are attached respectively to each end of the shaft. A two-way universal joint 32 supplies power from the tractor to a chain drive 33 which drives a gear 34 mounted on a power input shaft 35 of the gear assembly in the housing.

A second shaft 36 is journaled through the sleeves in the frame below the first shaft, and a rearwardly extending lever arm 37, 38 is attached to each end of the second shaft. Each lever arm is under a respective crank. Actuating arms 39, 40 connect each crank to its respective lever arm so that the second shaft oscillates automatically within the sleeves when the first shaft rotates as the tractor is driven along the ground. A V-shaped lifting member 41 is rigidly attached to the second shaft at 42, 43, and extends in a direction approximately parallel to the ground with the apex of the lifting frame extending rearwardly.

An elongated tongue 44 formed of a channel beam is attached longitudinally under the lifting member at its apex and extends along the center line of the lifting member so that the rear end of the tongue projects beyond the apex of the lifting member and the forward end of the tongue extends under the second rotatable shaft. The forward end of the tongue is attached to the under portion of a tubular guide 45 which is mounted around the center portion of the second rotatable shaft. A vertical bolt hole 46 is provided near the rear end of the tongue and a bracket 47 is rotatably attached to the underside of the tongue by means of a shoulder bolt 48 extending through the bolt hole. A grader blade 49 is mounted on the bracket to extend across the maximum transverse wheel base of the tractor. Each end of a semi-circular rack 50 is attached to an intermediate portion of the grader blade at 51, 52, with the arcuate portion of the rack extending under the lifting member and resting in a horizontal channel 53 formed under the forward end of the tongue. Thus, the grader blade can be rotated about the bolt so that the long axis of the blade forms any desired angle with the direction of the movement of the tractor. Means for locking the blade at any desired angle is described below in connection with the description of the embodiment of the invention shown in Fig. 5.

Fig. 1 shows in plan a typical irrigated field 54 susceptible to improvement by the device of the present invention. An irrigation ditch 55 runs transverse to the undisrupted rows 56 comprised of ridges 57 and furrows 58. A plurality of conduits 59 are provided through a wall 60 of the irrigation ditch. Each conduit is aligned with a respective furrow and supplies water to the field through the furrow when the disrupted area 61 is restored by the use of the invention.

In operation, the device is attached to the rear of a tractor as shown in Fig. 1. The grader blade extends from the conduits in the irrigation ditch wall to that portion of the rows which were not damaged during field operations, in other words the blade extends substantially across the disrupted area. The tractor is driven in a direction transverse to the rows. The gear ratio from the tractor power take-off to the crank is such that the crank is turned through a complete cycle for each 38 to 40 inches of tractor travel, this being the standard distance between rows in irrigated fields. As the tractor moves along, the crank is turned and the grader blade is periodically raised and lowered. The phasing of the movement of the blade with respect to the rows is such that the blade is at its highest point as it moves past the center of a ridge and is at its lowest point as it moves past the center of a furrow. Thus, the earth in the disrupted area between the irrigation ditch and the undisrupted rows is automatically scooped by the grader blade to form alternate parallel rows of furrows and ridges which connect the undisrupted rows in the field to their respective conduits in the irrigation ditch wall. The forming of the rows is done efficiently and in much less time than that required when the job is done by hand.

In some fields the rows are not at right angles to the irrigation ditch and it is desirable to turn the grader blade at an angle to conform with the direction of the rows. In such a case the grader blade is rotated to a dotted line position as shown in Fig. 1.

Another embodiment of the invention is shown in Fig. 5, in which two parallel channel beams 62, 63 extend longitudinally from the rear of a tractor 64 to form the bottom sides of a frame 65. A rigid gear box 66 is mounted between the forward ends of the bottom sides and provides structural support for the front part of the frame. Two upwardly extending straps 67, 68 are attached respectively to the forward ends of the bottom sides of the frame. The intermediate portion of the straps are inclined inwardly at an angle of about 50 degrees from the vertical. The upper ends of the straps are bent so they are substantially vertical and are attached to a short transverse bar 69 approximately half way between the bottom sides of the frame. A transverse shaft 70 is rigidly mounted at the rear end of the two bottom sides to complete the frame. The shaft is of reduced diameter at its center portion 71. The forward end of the frame is attached to the rear of the tractor at three suspension points 72, 73, 74.

A split bearing 75 is mounted around the shaft at the point of reduced diameter. An elongated member 76 is disposed under the point 77 between its ends to the bottom of the split bearing so that the member extends for some distance on each side of the shaft and is free to pivot about the shaft.

A gear reduction assembly 78 is mounted in the gear box and power is supplied to the gear assembly by a two-way universal joint 79 connected to a power take-off point (not shown) on the tractor. A crank 80 is mounted on a power take-off shaft 81 extending longitudinally from the gear assembly. An actuating arm 82 connects the crank to a ball-socket joint 83 mounted on the end of the pivotable member which is nearest the tractor, so that the member is raised and lowered as the crank turns.

A grader blade 49 is rotatably mounted on the other end of the member in the same manner as described for the embodiment of the invention shown in Figs. 1 through 4. As in the first embodiment, a semi-circular rack 50 is attached to the blade, the arcuate portion of the rack resting in a channel 53 formed by an L-shaped strip under the pivotal member. A longitudinal hole 84 is provided through the L-shaped strip and a plurality of such holes 85 are provided in the rack. A locking pin 86 mounted on the underside of the member is disposed to fit through the hole in the channel and any one of the holes in the rack which may be brought into alignment with the hole in the strip by rotation of the blade. A spring 87 holds the locking pin in position, and a release lever 88 is provided to disengage the pin from the locked position when desired.

The embodiment of the invention shown in Figs. 5 and 6 is used in the same manner as the embodiment shown in Figs. 1 through 4 to establish suitable irrigation rows in the disrupted part of an irrigated field.

We claim:

1. In a mobile earth moving device for forming a series of spaced transverse furrows in a first field area lying between an irrigation ditch and a second field area comprised of row crop furrows extending away from the ditch, the combination comprising a blade disposed at ground level to the rear of a tractor having a power take-off, the blade being transverse to the direction of movement of the device and extending substantially across the first area and the transverse wheel base of the tractor, and crank means connected to the blade and power take-off to be automatically responsive to the movement of the device along the ground for moving the blade up and down in a predetermined cycle to form a series of furrows extending transverse to the direction of tractor movement and which are at a length substantially greater than the distance across each irrigation furrow, each irrigation furrow formed in the first field area matching a respective row crop furrow.

2. In a mobile earth moving device for forming a series of spaced transverse furrows in a first field area lying between an irrigation ditch and a second field area comprised of row crop furrows extending away from the ditch, the combination comprising a frame, means for attaching the frame to the rear of a tractor having a power take-off, a member attached to the frame by a pivot so that it may be swung up and down on an axis transverse to the direction of movement of the tractor, a blade fastened to an unpivoted end of the member and disposed at ground level transverse to the direction of movement of the device to extend substantially across the first area, and crank means connected to the blade and power take-off to be automatically responsive to the movement of the device along the ground for moving the blade up and down in a predetermined cycle to form a series of irrigation furrows extending transverse to the direction of tractor movement and which are at a length substantially greater than the distance across each irrigation furrow, each irrigation furrow formed in the first field area matching a respective row crop furrow.

3. A mobile earth moving device adapted to be moved by a tractor having a power takeoff, the device comprising a frame adapted to be attached to the rear of the tractor, a member attached to the frame by a pivot so that it may be swung up and down on an axis transverse to the direction of movement of the tractor, an elongated blade rigidly fastened to the member at a point spaced from the pivot and disposed at ground level behind the tractor to extend at least substantially across the transverse wheel base of the tractor, a crank adapted to be connected to the power takeoff, and rigid linking means connecting the crank to the member so that the blade is lifted above and forced below ground level by power supplied from the power takeoff through the crank and linking means to form a series of furrows extending transverse to the direction of tractor movement which are of a length substantially greater than the distance across each furrow.

References Cited in the file of this patent
UNITED STATES PATENTS

| | | |
|---|---|---|
| 811,606 | Williams | Feb. 6, 1906 |
| 958,932 | Kline | May 24, 1910 |
| 1,278,216 | Reid | Sept. 10, 1918 |
| 1,401,029 | Armantout | Dec. 20, 1921 |
| 2,015,771 | Waller | Oct. 1, 1935 |
| 2,195,948 | Wentworth | Apr. 2, 1940 |
| 2,201,758 | Brockman | May 21, 1940 |
| 2,236,832 | Nielsen | Apr. 1, 1941 |
| 2,548,139 | Berry | Apr. 10, 1951 |